March 10, 1953 F. O. CHESUS ET AL 2,631,229

OSCILLATOR-MIXER CIRCUIT WITH SINGLE TRIODE TUBE

Filed Aug. 5, 1949

INVENTOR.
FRANK O. CHESUS
JOHN T. KOLEDA
BY Mock & Blum
ATTORNEYS

Patented Mar. 10, 1953

2,631,229

UNITED STATES PATENT OFFICE 2,631,229

OSCILLATOR-MIXER CIRCUIT WITH SINGLE TRIODE TUBE

Frank O. Chesus, Bayshore, and John T. Koleda, Islip, N. Y.

Application August 5, 1949, Serial No. 108,733

2 Claims. (Cl. 250—20)

This invention relates to a circuit for a combined oscillator and mixer utilizing a single vacuum tube, this circuit being particularly adapted for use in frequency modulation and television receivers. The circuit utilized is of such a nature that the single tube may be a triode.

We provide an R. F. input circuit, which may be coupled to a previous R. F. stage, and couple this R. F. input circuit by means of a condenser to the grid of a triode. This triode has in addition an oscillator circuit, the tank circuit of which is also coupled by a condenser to the grid. These two coupling condensers are of a low value to keep the coupling between the input and oscillator circuits to a minimum, so that they may be operated at a relatively low difference or intermediate frequency. The grid of the tube is properly biased so that the two signals impressed thereon will be mixed and a resulting intermediate frequency signal produced, generally in the plate circuit.

We prevent the intermediate frequency signal from feeding back into the input circuit by means of a resonant circuit consisting of an inductance and condenser connected in series between the grid and ground. This circuit offers low impedance to the intermediate frequency and high impedance to other frequencies.

While we can connect the cathode directly to ground, at high frequencies we find it advantageous to connect a condenser between the cathode and ground. This counteracts the lowering of the grid-to-cathode impedance of the tube, which becomes appreciable as the frequency rises, and tends to isolate the input and oscillator circuits.

Our invention makes possible an improved detection of radio frequency signals. We use a single triode oscillator-mixer, instead of a multi-element converter tube or separate mixer and oscillator tubes. This reduction in the number of tube elements reduces the amount of tube noise and therefore improves the signal-to-noise ratio.

Our invention is of particular use in frequency modulation and television receivers. We are able to provide a radio frequency tuner having a single envelope, an amplifier tube and a combined oscillator-mixer tube. This results in a smaller chassis and economy of construction.

Other objects and advantages of our invention will become apparent in the following description and annexed drawings, in which preferred embodiments are shown.

Figure 1:
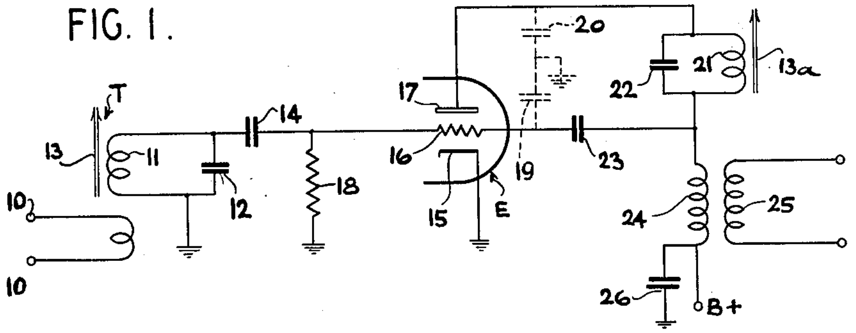
Fig. 1 is a schematic diagram showing our invention utilizing a Colpitts oscillator circuit.

Referring to the drawings in detail, and in particular to Fig. 1, it is seen that a signal is received across input terminals 10 of transformer T. This signal may be of a radio frequency and may be received from an antenna or from a prior radio frequency stage.

The secondary 11 of transformer T may be tuned by a fixed condenser 12 and may also be inductance-tuned by tuning means 13. Any suitable tuning means may be employed.

Secondary 11 and condenser 12 are connected in parallel, and one side of the circuit is grounded. The other side of the circuit is connected through coupling condenser 14 to the grid 16 of the oscillator-mixer tube.

This oscillator-mixer tube is placed in an envelope E, which may also contain one or more other tube units, such as a radio frequency amplifier tube, which are used in different circuits from the one here shown. The oscillator-mixer tube is preferably a triode and has a cathode 15 and plate 17.

In addition to the grid input circuit heretofore described, grid 16 is connected to ground by means of grid resistor 18.

The oscillator circuit shown in Fig. 1 is of the Colpitts type and makes use of the tube capacities. Optionally, any suitable oscillator circuits may be used, and our invention is not limited to the oscillator circuits herein described.

The tube capacities include grid-to-cathode capacity 19 and plate-to-cathode capacity 20, which are shown in broken lines. These capacities 19 and 20, together with coil 21 and condenser 22, comprise the tank circuit of the oscillator. One end of coil 21 is connected to plate 17, and the other end of coil 21 is coupled through condenser 23 to grid 16, and through primary 24 of the intermediate frequency transformer to the B+ plate voltage supply. The lower end of primary 24 is connected to ground through condenser 26. The oscillator grid bias is provided by resistor 18.

Coil 21 is tuned by tuning means 13*a*, which is preferably of the same type as tuning means 13 and ganged therewith so that the oscillator frequency will vary with the input signal frequency to produce the proper intermediate frequency over the entire band.

When the circuit is in operation, an input radio frequency signal is fed to terminals 10 of transformer T and thence to the tuned circuit 11, 12. From this tuned circuit 11, 12 the input signal goes through condenser 14 to grid 16.

Simultaneously, the tube generates a signal in oscillator tank circuit 19, 20, 21, 22, which is preferably slightly higher in frequency than the frequency of the input signal. The difference between the two frequencies is constant over the band and is the desired intermediate frequency. This oscillator signal remains in tank circuit 19, 20, 21, 22, because the path to ground through transformer 24 and condenser 26 offers high impedance to radio frequencies.

The two signals impressed on grid 16 are conventionally mixed, resistor 18 being of such a value that grid 16 is biased approximately to cut-off to give the desired plate rectification.

As a result of the mixing, the difference or intermediate frequency is produced in the plate circuit and passes through circuit 22, 23, transformer primary 24 and return condenser 26 to cathode 15. The signal is taken off by means of transformer secondary 25.

Figure 2:
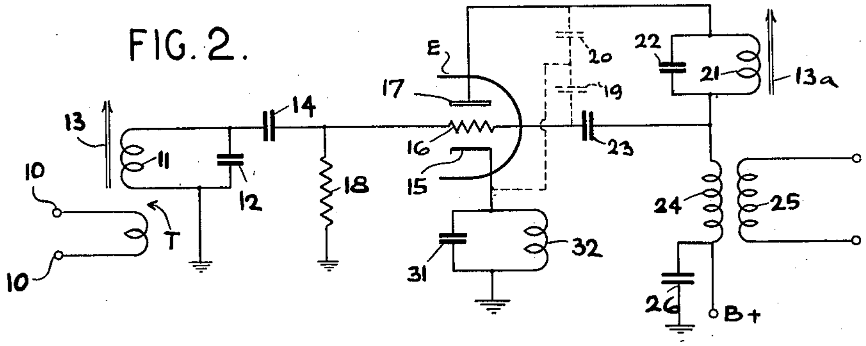
Fig. 2 is a view similar to Fig. 1, but showing a modification of the circuit thereof.

The circuit of Fig. 1 is particularly suitable for use at relatively low radio frequencies. For higher frequencies, we prefer to connect cathode 15 to ground by means of condenser 31, as is shown in Fig. 2. In this Fig. 2, inductance 32 is connected in parallel with condenser 31 to complete the path for the B+ plate voltage between plate 17 and cathode 15.

While at low frequencies the grid-to-cathode capacity 19 has little effect on the input circuit, at high frequencies capacity 19 offers relatively little impedance. As a result, less of the signal voltage drop occurs across condenser 14, which is undesirable.

When condenser 31 is added, as in Fig. 2, capacities 14, 19 and 31 are in series with the generator 11, 12; and most of the voltage drop takes place outside the tube.

In addition, condenser 31 reduces the coupling between the input and oscillator circuits. In the embodiment of Fig. 1, the input circuit has one side coupled to grid 16 and the other side grounded; and the oscillator circuit has one side also coupled to grid 16 and the other side connected to ground through capacity 19. At high frequencies, the impedance of capacity 19 becomes too low, and the coupling between the input and oscillator circuits is too high for them to operate at the proper difference frequency.

In the embodiment of Fig. 2, the oscillator circuit is connected to ground through capacity 19 and capacity 31, which together offer relatively high impedance to radio frequencies, thereby reducing the coupling between the input and oscillator circuits.

Figure 3:
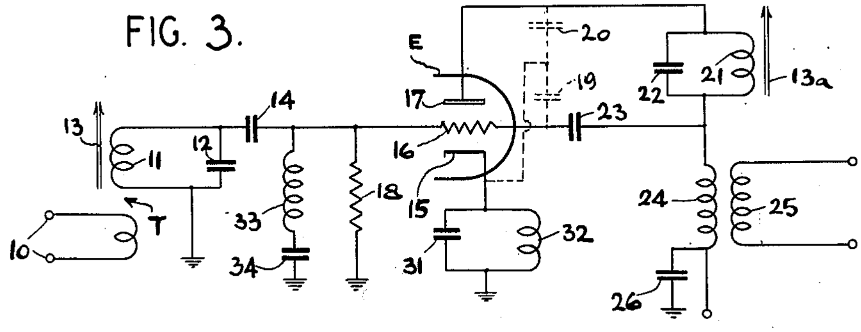
Fig. 3 is a view similar to Fig. 1, but showing a further modification of the circuit thereof.

A further modification of the circuit, shown in Fig. 3, is a resonant circuit to prevent any intermediate frequency signal from being fed back through condenser 23 to the input circuit. This resonant circuit comprises inductance 33 and condenser 34, which are connected in series between grid 16 and ground. The values of inductance 33 and condenser 34 are such that the circuit offers very low impedance to the intermediate frequency but high impedance to the radio frequencies employed. Optionally, any other suitable circuit may be employed between grid 16 and ground which offers high impedance to radio frequencies but low impedance to the intermediate frequency.

Figure 4:
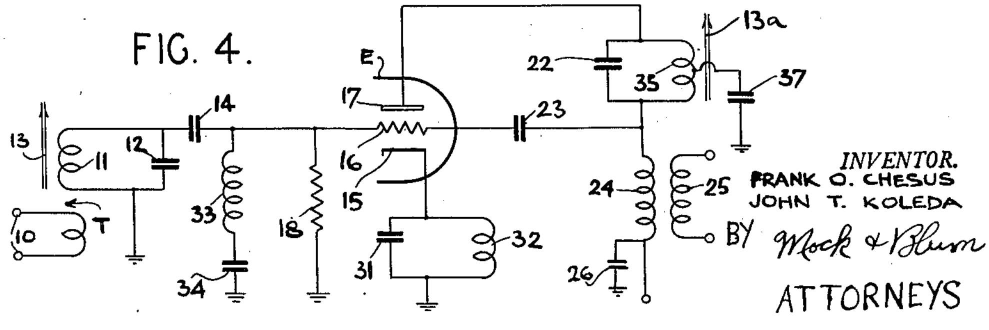
Fig. 4 is a schematic diagram showing our invention utilizing a Hartley oscillator circuit.

Fig. 4 is similar to Fig. 3, except that a Hartley oscillator is used instead of a Colpitts oscillator. The tank coil 35 is tapped at 36, and this tap 36 is connected to ground through condenser 37. The principle of operation of the circuit is the same as that of the circuit of Fig. 3.

As one example of the use of this circuit, a suitable tube which we employ is a 12AT7, in which capacities 19 and 20 are respectively about 2.5 and 0.45 micro-microfarads. The coupling condensers 14 and 23 respectively are given values of about 12 and 13 micro-microfarads.

Condenser 31 may be 12 micro-microfarads, and inductance 32 may be of any value such that the cathode circuit is resonant at a frequency different from that of the radio frequencies at which the circuit is operated.

In the intermediate frequency series resonant circuit, condenser 34 may have a value of 15 micro-microfarads, and in that case inductance 33 should have a value such that its reactance is equal to the reactance of condenser 34 at or near the intermediate frequency.

In all embodiments, we prefer to employ condensers 14 and 23 of low capacity, such as the illustrative values given above. This is because these condensers 14 and 23 respectively couple the input and oscillator circuits to grid 16 and therefore to each other. As stated above, it is desirable to maintain a low degree of coupling between these two circuits, and this is achieved by making condensers 14 and 23 of low value.

In addition to the modifications mentioned above, various other modifications can be made in our circuit without departing from the scope and spirit of our invention.

For example, we have shown an intermediate frequency output transformer 24, 25 having an untuned primary. However, other output circuits may be employed. Other input circuits may be employed. Other tubes besides a triode may be used.

What is claimed is:

1. A frequency converter system comprising an electron discharge tube having at least a cathode, an anode and an input grid, a source of input signal connected to said grid and connected in series with a first condenser to said cathode, a tuned circuit which comprises a second condenser and a coil connected in parallel, one of the connections between said second condenser and said coil being connected to said anode, the other of the connections between said second condenser and said coil being connected in series with a third condenser and said grid, said tube and said tuned circuit together acting as a source of local oscillations which are impressed between said grid and said cathode, and means for deriving from the anode to cathode circuit of said tube the sum or difference frequency between said signal and locally produced oscillations.

2. A frequency converter system in accordance with claim 1, in which said input signal source is bypassed by a circuit which is resonant to said sum or difference frequency.

FRANK O. CHESUS.
JOHN T. KOLEDA.

REFERENCES CITED

The following references are of record in the file of this patent:

UNITED STATES PATENTS

| Number | Name | Date |
|---|---|---|
| 1,997,393 | Roberts | Apr. 9, 1935 |
| 2,049,777 | Mountjoy | Aug. 4, 1936 |
| 2,128,422 | Lindenblad | Aug. 30, 1938 |
| 2,141,774 | Truefitt | Dec. 27, 1938 |
| 2,151,800 | Rocard | Mar. 28, 1939 |
| 2,252,609 | Beck | Aug. 12, 1941 |
| 2,432,183 | Van Slooten | Dec. 9, 1947 |